United States Patent Office 2,964,558
Patented Dec. 13, 1960

2,964,558

PREPARATION OF ACRYLIC ESTERS

Joel M. F. Leathers, Freeport, and William P. Coker, Lake Jackson, Tex., assignors to The Dow Chemical Company, Midland, Mich., a corporation of Delaware No Drawing. Filed Oct. 1, 1958, Ser. No. 764,518

11 Claims. (Cl. 260—486)

This invention relates to a process for the preparation of an acrylic ester, and more particularly, to the preparation of an acrylic ester by the reaction of an alcohol with carbon monoxide and acetylene at a high pressure and temperature.

This application is a continuation-in-part of a copending application Serial No. 615,760, filed October 15, 1956, now abandoned.

The preparation of acrylic esters by the reaction of an alcohol with carbon monoxide and acetylene is well known. In the prior art processes, the alcohol is introduced into a reactor and the acetylene and carbon monoxide as a gaseous mixture is charged into the reactor and used as a means for pressurizing it. The reaction is carried out at a temperature in the range of 130° to 180° C. and under a relatively low pressure, such as 30 atmospheres. As a result of the low temperature and pressure, the reaction time required is exceedingly long etxending up to 100 hours for a nickel halide catalyst and up to at least 24 to 50 hours for other more active catalysts. This exceedingly long reaction time makes the prior art processes economically unattractive for commercial operation. While temperatures as high as 250° C. and higher pressures have been suggested, they have not been used due to the polymerization of the acrylic esters formed at the higher temperatures and the danger of spontaneous decomposition of the acetylene. Since a gaseous mixture of acetylene and carbon monoxide is used to pressurize the reactor, the maximum safe working pressure is around 30 atmospheres. Due to the exceedingly long reaction time, the polymerization of the esters formed considerably reduces the yields. The polymerization of the acrylic esters in the reaction product at the higher temperatures of the prior art and the danger of spontaneous decomposition of the acetylene resulted in using the low temperatures and pressures and considerable effort was made heretofore to find a more active catalyst which would enable the reaction to proceed at milder conditions.

It is, therefore, the principal object of this invention to provide an improved process for the preparation of an acrylic ester which overcomes the disadvantages of the process heretofore used. A further object is to provide a process where a high pressure and temperature can be used in the reaction of an alcohol with acetylene and carbon monoxide without the danger of the spontaneous decomposition of the acetylene.

The above and other objects may be obtained by reacting acetylene with carbon monoxide and an aliphatic saturated alcohol having up to 12 carbon atoms. In carrying out the reaction, the acetylene is dissolved in the alcohol or, when acetylene is not soluble or only partially soluble in the alcohol, in an organic acetylene solvent. After acetylene is dissolved, the alcohol or the alcohol and solvent containing the acetylene is pressurized with carbon monoxide and resulting mixture is heated in the presence of a known catalyst to react the acetylene, alcohol, and carbon monoxide at a temperature in the range of 220° to 270° C. and a pressure in the range of 2000 to 4500 pounds per square inch to form the acrylic ester.

The reaction effected may be illustrated by the following equation showing the reaction of acetylene with methanol and carbon monoxide:

$$HC \equiv CH + CH_3OH + CO \rightarrow H_2C = CH - COOCH_3$$

Theoretically one mole of acetylene reacts with one mole each of the carbon monoxide and the alcohol. However, it is preferred to use a slight excess of the alcohol.

The alcohols which may be thus reacted are aliphatic saturated alcohols having up to 12 carbon atoms which are stable at the reaction temperature. Primary, secondary and tertiary alcohols may be used. Illustrative examples of the alcohols are methanol, ethanol, propanol, isopropanol, butanol, isobutanol, pentanol, hexanol, 3-methyl-pentanol, octanol, isooctanol, and 3-methyl-hexanol-1.

It has been discovered that when the above reaction is carried out at temperatures of 220° to 270° C. and a pressure of from 2000 to 4500 pounds per square inch an unexpectedly high rate of reaction is obtained and substantially complete conversion of the acetylene may be obtained in 5 to 15 minutes instead of the 100 to 50 hours required previously.

Although the rate of reaction increases with pressure, the unexpected increase in rate of reaction is mainly due to the temperature of the reaction. When a reaction temperature of 200° C. at 2000 pounds per square inch pressure is used, no apparent pressure drop in the reactor is obtained in 45 minutes which indicates that in this time materially no reaction has taken place. At 210° C. and 2100 pounds per square inch pressure, only about 7 percent conversion of the acetylene is obtained in a reaction time of three hours. However, a critical temperature is reached at around 220° C. where at this temperature and above the reaction is almost instantaneous and substantially completed in 5 to 15 minutes. Copenhaver and Bigelow in "Acetylene and Carbon Monoxide Chemistry" report that in the reaction of an alcohol with carbon monoxide and acetylene at a reaction temperature of 180° C. using a nickel halide catalyst, a reaction time of 100 hours is required.

In the prior art, high temperatures and pressures could not be used due to the possibility of spontaneous decomposition and detonation of the acetylene, since gaseous acetylene was used to pressurize the reaction. It has been discovered that when the acetylene is first dissolved in the reactant or a solvent prior to pressurization, the reaction may be carried out safely at these high temperatures and pressures. By dissolving the acetylene in a liquid, the handling of gaseous acetylene at the dangerous temperatures and pressures is avoided. Where the reactants, such as methanol, ethanol, and other alcohols are used in which acetylene is soluble, it is preferred to use the reactant alcohol as the solvent. Where acetylene is insoluble or partially soluble in the reactant alcohol, inert organic solvents which are non-reactive and stable, such as dioxane, tetrahydrofuran, ethyl acetate, and n-methyl pyrrolidone, may be employed.

The reaction may be carried out in batch or continuous operation. In a batch process, the alcohol or the alcohol with the acetylene solvent is placed in the reactor. The reactor is purged with nitrogen or other inert gas to remove the air. Acetylene is then dissolved in the alcohol or solvent by introducing the acetylene under safe working pressure, such as 125 pounds per square inch or less. At a pressure of around 115 to 125 pounds per square inch acetylene may be safely handled up to temperatures of 100° C. Generally, the solvent or alcohol is at room temperature and temperatures at which acetylene could not be safely handled at about 100–125 pounds per square inch pressure are not approached. After the desired amount of the acetylene is dissolved in the reactant or in the solvent, carbon monoxide is used to pressurize the reactor. The pressure in the reactor will increase when the reactor is heated so that it is generally only necessary to pressurize the reactor to a pressure in the range of 900 to 1100 pounds per square inch. The reactor is then gradually heated to the reaction temperature and the reaction carried out at the required pressure. The completion of the reaction is characterized by a rapid pressure drop of around 500 or more pounds per square inch which usually occurs in 5 to 15 minutes. The reactor is then cooled, the gases vented, and the product recovered. In a continuous process, the acetylene is first dissolved in the alcohol or solvent and introduced into the reactor with the other reactants. The reactor is maintained at the required conditions and the rates of the reactants are adjusted to give the required residence time in the reactor.

Although a reaction temperature in the range of 220° to 270° C. and a pressure in the range of 2000 to 4500 pounds per square inch may be employed, it is generally preferred to use a reaction temperature in the range of 240° to 250° C. and a pressure in the range of 2500 to 3500 pounds per square inch. At the preferred conditions, a rapid rate of reaction is obtained which is not materially increased by further increases in the reaction temperature and pressure.

Any of the known catalysts for synthesis of acrylates may be used in the reaction. Some of the catalysts known to promote the reaction are salts or complexes of metals, such as nickel or cobalt, which are capable of forming carbonyls. Especially effective are inorganic nickel salts, such as nickel halides and organic complexes of the nickel inorganic salts, such as complexes of triphenyl phosphine and nickel halides and complexes of nickel halides with organic ammonia compounds. In addition to inorganic salts, organic acid salts of nickel and cobalt, such as nickel and cobalt salts of formic, acetic, propionic, and oxalic acids may be used. When the organic salts are used, it is generally preferred to add the corresponding organic acid to the catalyst. With the addition of the corresponding acid, the nickel or cobalt catalyst which has been converted to the carbonyl in the reaction is regenerated to the organic salt in situ. The amount of catalyst required in the instant process is the same as for the prior art processes for synthesis of acrylates. Generally, an amount equal to 0.1 to 5 weight percent of the hydroxy compound charged is used, being dispersed or dissolved in the alcohol or solvent.

Due to the rapid rate of reaction obtained at the high temperature and pressure, the acrylic esters formed in the reaction product are subjected to conditions favorable for polymerization for only a relatively short time. Thus practically no polymerization is obtained. However, polymerization inhibitors, such as hydroquinone, or copper sulfate, may be added to reduce any possible polymerization which may occur in this time.

Various methods which are apparent to people skilled in the art may be used to recover the acrylic esters from the reaction mixtures. Generally the acrylic ester may be easily separated from the reaction mixture by distillation.

The following examples further illustrate the invention but are not to be construed as limiting it thereto.

*Example I*

In a stainless steel bomb 200 milliliters of methanol and 1.5 grams of nickel bromide were placed. The bomb was closed and purged with nitrogen. The acetylene was then charged into the bomb, which was shaken to help dissolve the acetylene, until a pressure of 100 pounds per square inch was reached. The amount of acetylene dissolved was determined by the weight difference of the bomb and found to be 15 gm. Carbon monoxide was then introduced into the bomb until a pressure of around 1000 pounds per square inch was obtained. The bomb was then placed in a rocker and heated to 248° C. The pressure rose to 3000 pounds per square inch which remained constant for around 5 minutes and then rapidly dropped to around 2400 pounds per square inch. The bomb was cooled to room temperature and a liquid product of 180 gm. was recovered after venting the gases.

The liquid product was analyzed by mass spectrometer and found to contain 19 weight percent methyl acrylate, 1.4 weight percent dimethyl acetal, 1.4 weight percent acetaldehyde, 1.4 weight percent methylal, 7.5 weight percent dimethyl ether, and the remainder methanol. This represented a 92 percent conversion of the acetylene charged and a yield of methyl acrylate of 62.5 percent based upon the acetylene reacted.

To show the effect of temperature, the above run was repeated except that a reaction temperature of 210° C. was used. The pressure in the bomb rose to 2100 pounds per square inch and dropped to 2050 pounds per square inch at the end of a 3 hour reaction time.

The product obtained was analyzed by mass spectrometer and found to contain only 1.4 weight percent of methyl acrylate. This represented a 6.8 percent conversion of the acetylene and a yield of 4.5 percent of methyl acrylate, based upon the acetylene reacted.

Another run was made at 200° C. and 2000 pounds per square inch pressure using 1.5 gm. of nickel iodide as catalyst instead of nickel bromide. At the end of 45 minutes, no apparent pressure drop in the reactor was obtained.

*Example II*

In a stainless steel bomb, 300 ml. of 3-methylhexanol-1 and 1.5 gm. of nickel bromide were placed. The bomb was closed and purged with nitrogen. Acetylene was then charged into the bomb which was shaken until a pressure of 100 pounds per square inch was reached. The amount of acetylene dissolved was determined by the weight difference of the bomb and found to be 15 gm. Carbon monoxide was then introduced into the bomb until a pressure of around 1000 p.s.i.g. was obtained. The bomb was then placed in a rocker and heated to 235° C. The pressure rose to around 2100 lbs. per square inch which remained constant for around 5 minutes and then rapidly dropped to around 1500 pounds per square inch. The bomb was cooled to room temperature and a liquid product of 275 gm. was recovered after venting the gases.

The liquid was analyzed by infra-red and found to contain 23.2 weight percent 3-methylhexyl acrylate. This represented a yield of 60 percent based on the acetylene reacted. The acetylene conversion was 89 percent.

*Example III*

In a manner similar to that described in Example I, ethanol was reacted with acetylene to obtain ethyl acrylate using a mixture of nickel oxalate and oxalic acid as catalyst.

To the stainless steel bomb, 200 milliliters of ethanol and as a catalyst 1.5 grams of nickel oxalate and 63 grams of oxalic acid were added. Hydroquinone in an amount of 5 grams was also added. The bomb was then purged of nitrogen and acetylene dissolved in the bomb contents in an amount of 20 grams. After the acetylene was dissolved, the bomb was pressurized by the addition of 30 grams of carbon monoxide.

Upon reaction of the mixture at 244° C. and a pressure of 2775 pounds per square inch for 30 minutes, a 77.8 percent conversion of acetylene was obtained with a yield of 94.7 percent of ethyl acrylate.

*Example IV*

In a manner similar to that described in Example I, methanol and acetylene was reacted using a mixture of nickel formate, pyridine, and formic acid as a catalyst to obtain methyl acrylate.

To the stainless steel bomb, 200 milliliters of methanol and, as a catalyst, 1.5 grams of nickel formate, 7.5 grams of pyridine, and 26.2 grams of an 88 weight percent of a formic acid solution were added. Hydroquinone in an amount of 5 grams was also added. The bomb was then closed and purged with nitrogen. The acetylene was then charged into the bomb, which was shaken to help dissolve the acetylene, until 20 grams of acetylene were dissolved. Carbon monoxide was then introduced into the bomb in an amount of 60 grams. The bomb was then placed in a rocker and heated to 233° C. The pressure rose to 2610 pounds per square inch.

Upon analysis of the reaction product after cooling of the bomb, it was found that an 86 percent conversion of the acetylene was obtained.

What is claimed is:

1. A process for the preparation of an acrylic ester by the reaction of acetylene with carbon monoxide and an aliphatic saturated alcohol having from 1 to 12 carbon atoms, which comprises dissolving the acetylene in a liquid selected from the group consisting of the reactant alcohol and a mixture of the reactant alcohol and an inert organic acetylene solvent, and subsequently reacting the dissolved acetylene with the alcohol and carbon monoxide at a temperature in the range of 220° to 270° C. in the presence of a catalyst known to promote the reaction with an excess of carbon monoxide sufficient to give a pressure within 2000 to 4500 pounds per square inch.

2. A process according to claim 1 wherein the catalyst is a nickel halide catalyst.

3. A process for the preparation of methyl acrylate, which comprises dissolving acetylene in methanol, subsequently pressurizing the methanol solution containing the acetylene with a stoichiometric excess of carbon monoxide, heating the pressurized mixture, in the presence of a catalyst known to promote the reaction, to react the acetylene, methanol, and carbon monoxide at a temperature in the range of 220° to 270° C. and a pressure in the range of 2000 to 4500 pounds per square inch to form the methyl acrylate, and separating the methyl acrylate formed.

4. A process for the preparation of methyl acrylate, which comprises dissolving acetylene in methanol at room temperature and subsequently reacting the mixture at a temperature in the range of 220° C. to 270° C. in the presence of a nickel halide catalyst with an excess of carbon monoxide sufficient to give a pressure within the range of 2000 to 4500 pounds per square inch.

5. A process according to claim 4 wherein the mixture is reacted at a temperature in the range of 240° to 250° C. and a pressure in the range of 2500 to 3500 pounds per square inch.

6. A process for the preparation of methyl acrylate, which comprises dissolving acetylene in methanol at room temperature and subsequently reacting the mixture at a temperature in the range of 220° to 270° C. in the presence of a nickel formate-pyridine mixture as catalyst with an excess of carbon monoxide sufficient to give a pressure within the range of 2000 to 4500 pounds per square inch.

7. A process according to claim 6 wherein the mixture is reacted at a temperature in the range of 240° to 250° C. and a pressure in the range of 2500 to 3500 pounds per square inch.

8. A process for the preparation of 3-methylhexyl acrylate, which comprises dissolving acetylene in 3-methylhexan-1-ol, subsequently pressurizing the 3-methylhexan-1-ol solution containing the acetylene with a stoichiometric excess of carbon monoxide, heating the pressurized mixture, in the presence of a catalyst known to promote the reaction, to react the acetylene, 3-methylhexan-1-ol, and carbon monoxide at a temperature in the range of 220° to 270° C. and a pressure in the range of 2000 to 4500 pounds per square inch to form the 3-methylhexyl acrylate, and separating the acrylate formed.

9. A process according to claim 8 wherein the catalyst is nickel halide, the temperature is in the range of 240° to 250° C., and pressure in the range of 2500 to 3500 pounds per square inch.

10. A process for the preparation of ethyl acrylate, which comprises dissolving acetylene in ethanol, subsequently pressurizing the ethanol solution containing the acetylene with a stoichiometric excess of carbon monoxide, heating the pressurized mixture, in the presence of a catalyst known to promote the reaction, to react the acetylene, ethanol, and carbon monoxide at a temperature in the range of 220° to 270° C. and a pressure in the range of 2000 to 4500 pounds per square inch to form the ethyl acrylate, and separating the acrylate formed.

11. A process according to claim 10 wherein the catalyst is a mixture of nickel oxalate and oxalic acid, the temperature is in the range of 240° to 250° C., and pressure in the range of 2500 to 3500 pounds per square inch.

References Cited in the file of this patent

UNITED STATES PATENTS

| | | |
|---|---|---|
| 2,738,364 | Reppe et al. | Mar. 13, 1956 |
| 2,851,486 | Natta et al. | Sept. 9, 1958 |

OTHER REFERENCES

Reppe: "Acetylene Chemistry," P.B. Report 18852-S, 1949, pages 173–177.